United States Patent
Peterson et al.

(10) Patent No.: US 9,813,422 B2
(45) Date of Patent: Nov. 7, 2017

(54) DETECTING UNAUTHORIZED RISKY OR INEFFICIENT USAGE OF PRIVILEGED CREDENTIALS THROUGH ANALYSIS OF TASK COMPLETION TIMING

(71) Applicant: Dell Software, Inc., Round Rock, TX (US)

(72) Inventors: Matthew T. Peterson, Lindon, UT (US); Daniel F. Peterson, Pleasant Grove, UT (US); Jordan S. Jones, Spanish Fork, UT (US)

(73) Assignee: Quest Software Inc., Aliso Viejo, CA (US)

( * ) Notice: Subject to any disclaimer, the term of this patent is extended or adjusted under 35 U.S.C. 154(b) by 183 days.

(21) Appl. No.: 14/700,502

(22) Filed: Apr. 30, 2015

(65) Prior Publication Data
US 2016/0323288 A1 Nov. 3, 2016

(51) Int. Cl.
G06F 7/04 (2006.01)
G06F 15/16 (2006.01)
G06F 17/30 (2006.01)
H04L 29/06 (2006.01)

(52) U.S. Cl.
CPC ........ H04L 63/102 (2013.01); H04L 63/0281 (2013.01); H04L 63/1441 (2013.01)

(58) Field of Classification Search
CPC .................................................. H04L 63/102
USPC ........................................................... 726/4
See application file for complete search history.

(56) References Cited

U.S. PATENT DOCUMENTS

| | | | | |
|---|---|---|---|---|
| 8,756,655 | B2* | 6/2014 | Hoesl | G06F 21/62 726/2 |
| 9,509,772 | B1* | 11/2016 | Rose | H04L 67/1097 |
| 2007/0198977 | A1* | 8/2007 | Abernethy, Jr. | G06Q 10/06 718/100 |
| 2007/0283422 | A1* | 12/2007 | Iyoda | G06F 21/6227 726/4 |
| 2013/0190094 | A1* | 7/2013 | Ronen | A63F 13/12 463/42 |
| 2013/0325763 | A1* | 12/2013 | Cantor | G06Q 10/0633 706/12 |
| 2014/0129607 | A1* | 5/2014 | Nagumo | H04L 41/5048 709/201 |
| 2017/0026381 | A1* | 1/2017 | Wesseling | G06F 17/30864 |
| 2017/0264604 | A1* | 9/2017 | Drako | H04L 63/083 |

* cited by examiner

*Primary Examiner* — Dant Shaifer Harriman
(74) *Attorney, Agent, or Firm* — Brian Tucker; Kirton McConkie

(57) ABSTRACT

A privileged account management system can maintain a database that defines a normal amount of time that it takes to perform a task associated with a reason code. When an administrator requests admin credentials for accessing a server, the administrator can provide a reason code which defines a task that the administrator intends to accomplish. A PAM system can maintain a database that defines, for each reason code, a normal amount of time that is required to accomplish the task associated with the reason code. The PAM system can then monitor an elapsed time over which the admin credentials are checked out to an administrator to determine whether the elapsed time exceeds the corresponding normal amount of time. If the elapsed time exceeds the normal amount, the PAM system can take appropriate action to mitigate any potential harm to the server.

20 Claims, 15 Drawing Sheets

| Reason Code 401 | Normal Amount 402 |
|---|---|
| Reboot Server | 2:30 |
| Back up Server | 10:00 |
| Apply OS update A | 6:00 |
| Deploy Application A | 17:30 |
| ... | ... |

| Reason Code 411 | Server 412 | Normal Amount 413 |
|---|---|---|
| Reboot Server | Server A | 3:00 |
| Reboot Server | Server B | 2:30 |
| Back up Server | Server A | 11:00 |
| Back up Server | Server B | 9:30 |
| Apply OS update A | Server A | 5:30 |
| Apply OS update A | Server B | 7:30 |
| Deploy Application A | Server A | 17:00 |
| Deploy Application A | Server B | 17:30 |

| Reason Code 421 | Admin 422 | Normal Amount 423 |
|---|---|---|
| Reboot Server | Admin A | 3:30 |
| Reboot Server | Admin B | 3:00 |
| Back up Server | Admin A | 12:00 |
| Back up Server | Admin B | 14:30 |
| Apply OS update A | Admin A | 6:30 |
| Apply OS update A | Admin B | 6:00 |
| Deploy Application A | Admin A | 19:00 |
| Deploy Application A | Admin B | 16:00 |

FIG. 4C

| Reason Code 431 | Admin 432 | Normal Amount 433 |
|---|---|---|
| Reboot Server | Group A | 2:30 |
| Reboot Server | Group B | 3:00 |
| Back up Server | Group A | 11:00 |
| Back up Server | Group B | 13:00 |
| Apply OS update A | Group A | 7:00 |
| Apply OS update A | Group B | 6:30 |
| Deploy Application A | Group A | 19:30 |
| Deploy Application A | Group B | 22:00 |

FIG. 4D

| Reason Code 431 | Server 432 | Admin 433 | Normal Amount 434 |
|---|---|---|---|
| Reboot Server | Server A | Admin A | 2:30 |
| Reboot Server | Server B | Admin A | 3:30 |
| Reboot Server | Server A | Admin B | 2:00 |
| Reboot Server | Server B | Admin B | 2:30 |
| Back up Server | Server A | Admin A | 13:00 |
| Back up Server | Server B | Admin A | 23:00 |
| Back up Server | Server A | Admin B | 11:00 |
| Back up Server | Server B | Admin B | 20:00 |

For Each Of A Plurality Of Reason Codes, Identify A Plurality Of Requests For Admin Credentials That Specify The Reason Code

702

For Each Of The Plurality Of Requests, Identify An Elapsed Time Over Which The Admin Credentials Were Checked Out While A Task Associated With The Reason Code Was Performed

703

Generate A Normal Amount For The Reason Code Based On The Plurality Of Identified Elapsed Times Such That The Normal Amount Defines An Amount Of Time That Is Normally Required To Perform The Task Associated With The Reason Code

*FIG. 7*

DETECTING UNAUTHORIZED RISKY OR INEFFICIENT USAGE OF PRIVILEGED CREDENTIALS THROUGH ANALYSIS OF TASK COMPLETION TIMING

CROSS-REFERENCE TO RELATED APPLICATIONS

N/A

BACKGROUND

Most organizations maintain at least one server for storing sensitive information and executing secure resources. For example, an organization may maintain a customer database that stores sensitive information about its customers on a server. Typically, access to such servers is restricted by locating the servers in a secure area and by requiring admin credentials to obtain access to the servers. In this specification, access to a server should be construed broadly as encompassing access to any data stored on the server, access to any application executing on the server (including the operating system of the server), or access to any other computing construct provided by the server.

In such cases, an organization will typically employ one or more administrators to maintain the servers. To allow these administrators to perform their assigned functions, they may oftentimes share the admin credentials for accessing the secure servers so that any one of the administrators can use the admin credentials at any particular time. FIG. 1 depicts this typical scenario. As shown, an administrator 150 uses a client device 102 to access a server 101 using admin credentials known to administrator 150 and possibly to other administrators. Access in this manner is typically accomplished by using a network protocol (e.g., SSH, RDP, Telnet, etc.) to remotely connect to server 101.

Various problems exist with this approach including, for example, that an administrator may retain knowledge of the admin credentials even after his employment with the organization, and that there are few options for identifying which administrator has used the admin credentials to perform a particular task on server 101. To address these problems, an organization may oftentimes employ a privileged account (or access) management ("PAM") system. Generally, a PAM system acts as an intermediary between server 101 and client device 102 to manage and/or monitor access to server 101.

PAM systems can typically perform two basic functions. First, a PAM system can control and monitor who obtains access to the admin credentials. This is typically accomplished by frequently changing the admin credentials (e.g., after each use of the admin credentials). FIG. 2A depicts an example of a PAM system providing this function. Second, a PAM system can monitor the interactions of the administrator with the server while using a remote session to connect to the server. FIGS. 2B and 2C depict different examples of a PAM system providing this function.

In FIG. 2A, a PAM system 103 acts as an intermediary between client device 102 and server 101 to control and monitor who obtains access to the admin credentials for creating a session with server 101. In this scenario, it will be assumed that PAM system 103 updates the admin credentials (e.g., changes the password) after each time an administrator is given access to the admin credentials (e.g., after each time an administrator checks in the admin credentials). Accordingly, prior to accessing server 101, an administrator is required to request the current admin credentials. As shown, in step 1, administrator 150 uses client device 102 to send a request to PAM system 103 for the current admin credentials for accessing server 101. Typically, this request will first require authentication (e.g., the input of credentials specific to administrator 150) and specify a reason for the request (e.g., to reboot server 101, back up server 101, install or update a server resource, etc.). In such cases, a security officer 151 will be notified of the request. In step 2, the security officer approves the request causing the current admin credentials to be returned to (or checked out to) client device 102 in step 3. Then, in step 4, administrator 150 can use the checked out admin credentials to create a session (e.g., an SSH or RDP session) with server 101 to accomplish the desired tasks. Finally, in step 5, after completing the desired tasks, administrator 150 checks in the admin credentials. Typically, PAM system 103 would then change the admin credentials to prevent administrator 150 from being able to again access server 101 without first repeating steps 1-3.

FIGS. 2B and 2C represent different ways in which PAM system 103 may be configured to allow a session to be monitored. In some implementations, this monitoring can be performed in conjunction with the functions described with reference to FIG. 2A. FIG. 2B represents a case where PAM system 103 employs a proxy between client device 102 and server 101. In contrast, FIG. 2C represents a case where PAM system 103 employs an agent on server system 101 to manage a session with client device 102. Although not specifically described, PAM system 103 could also employ a hosted session configuration which, for purposes of this background, would be illustrated in a similar manner as FIG. 2B but with the proxy being replaced by a hosted session component. It is noted that the specific configuration employed by PAM system 103 is not essential to the invention, and the invention applies equally to any configuration of PAM 103.

In the proxy configuration depicted in FIG. 2B, administrator 150, in step 1, uses client device 102 to send a request to PAM system 103 for a privileged session with server 101. Typically, this request would require authentication, include a reason for the access, and require approval by security officer 151 in step 2. Assuming the request is approved, in step 3, PAM system 103 implements a proxy 201 for maintaining two remote sessions. Step 3a represents the creation of a session (e.g., an SSH or RDP session) between proxy 201 and server 101 in which the admin credentials are used by proxy 201 to access server 101. Step 3b represents the creation of a corresponding session (e.g., an SSH or RDP session) between client device 102 and proxy 201. Proxy 201 acts as an intermediary for routing session traffic between the corresponding sessions. Because all communications between client device 102 and server 101 pass through proxy 201, PAM system 103 can monitor the session as shown in step 4. In this depicted implementation, the admin credentials are never provided to administrator 150.

It is noted that a variation on the implementation shown in FIG. 2B exists in which the admin credentials are provided to administrator 150 (e.g., as described with reference to FIG. 2A). In such a variation, rather than having PAM system 103 automatically initiate the corresponding sessions via proxy 201, administrator 150 may first initiate a session with proxy 201 using the admin credentials, and then proxy 201 would initiate a corresponding session with server 101. Similarly, when the administrator is provided with the admin credentials, a PAM system may be configured to implement a transparent proxy or other type of proxy. However, as mentioned above, the present invention can be implemented in any PAM system configuration including many different types of proxy configurations.

In the agent configuration depicted in FIG. 2C, a similar set of steps are followed. The primary difference between the proxy and host configurations is that in the host configuration, the host has direct access to the server resources because it executes on server 101, and therefore a single session is required between client device 102 and agent 202. In other words, agent 202 can access server resources in a similar manner as a user could if directly interacting with server 101. In the agent configuration, for purposes of this specification, the agent that executes on the server is considered as being part of the PAM system. As with the proxy implementation, the session between client device 102 and agent 202 can be initiated automatically by PAM system 103 (e.g., in implementations where the admin credentials are not provided to administrator 150), or the session can be initiated in response to a request from client device 102 (e.g., in implementations where the admin credentials are provided to administrator 150).

In each of the configurations represented by FIGS. 2B and 2C, PAM system 103 can be configured to monitor and store any communications that are transmitted over a session between client device 102 and server 101. This monitoring can typically include capturing keystrokes and mouse input among other things.

BRIEF SUMMARY

The present invention extends to methods, systems, and computer program products for detecting unauthorized, risky, or inefficient usage of privileged credentials through analysis of task completion timing. When an administrator requests admin credentials for accessing a server, the administrator can provide a reason code which defines a task that the administrator intends to accomplish. A PAM system can maintain a database that defines, for each reason code, a normal amount of time that is required to accomplish the task associated with the reason code. The PAM system can then monitor an elapsed time over which the admin credentials are checked out to an administrator to determine whether the elapsed time exceeds the corresponding normal amount of time. If the elapsed time exceeds the normal amount, the PAM system can take appropriate action to mitigate any potential harm to the server.

The normal amount of time that is associated with a reason code can be generated by monitoring, over a period of time, the elapsed time over which admin credentials are checked out when accomplishing the corresponding task. From these monitored elapsed times, the PAM system can generate the normal amount of time using some algorithm such as an averaging algorithm. In some embodiments, a normal amount may be generated that is specific to a particular server on which the task will be completed and/or that is specific to a particular administrator, a particular peer group, or some other grouping of administrators.

In one embodiment, the present invention is implemented as a method, performed by a privileged account management system, for detecting unauthorized, risky, or inefficient usage of admin credentials. A database is maintained that defines, for each of a plurality of reason codes, a normal amount of time for performing a task associated with the reason code. A request to access a first server using admin credentials is received. The request includes a first reason code that identifies a first task that a first administrator intends to perform on the first server. In response to the request, the admin credentials are checked out to the first administrator to enable the first administrator to access the first server. The database is accessed to identify a first normal amount of time that is defined for the first reason code. The PAM system tracks an elapsed time over which the admin credentials are checked out to the first administrator. The elapsed time is compared to the first normal amount of time. When the elapsed time exceeds the first normal amount of time by a defined threshold, an action is taken to mitigate harm to the server.

In another embodiment, the present invention is implemented as a method, performed by a privileged account management system, for creating a database that defines, for each of a plurality of reason codes, an average amount of time for performing a task associated with a reason code. For each of the plurality of reason codes, a plurality of requests for admin credentials is identified where each request specifies the reason code. For each of the plurality of requests, an elapsed time is identified over which the admin credentials were checked out while a task associated with the reason code was performed. A normal amount for the reason code is generated based on the plurality of identified elapsed times such that the normal amount defines an amount of time that is normally required to perform the task associated with the reason code.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 4A-4E each illustrate different example data structures that can be maintained by a PAM system to define normal amounts of time for completing tasks associated with reason codes;

FIG. 7 illustrates a flowchart of an example method for creating a database that defines, for each of a plurality of reason codes, a normal amount of time that is required to complete a task associated with the reason code.

DETAILED DESCRIPTION

In this specification, a reason code should be construed as any type of information which specifies a reason for which an administrator is requesting privileged access to a server. Examples of reason codes include: reboot the server, back up the server, apply an operating system update, deploy an application, etc. A PAM system can be configured to allow any reason code to be created and used by an administrator to request access to a server. In this specification, it will be assumed that, prior to obtaining access to a server, an administrator is required to provide a reason code that identifies the task that the administrator would like to accomplish on the server. A security officer, upon reviewing the administrator's reason code, may grant or deny the requested access (e.g., by allowing the administrator to check out admin credentials which the administrator can use to access the server (whether via a remote session or via direct access to the server) or by creating a remote session for the administrator using the admin credentials).

In this specification, the phrase "checking out admin credentials" should be construed to include instances where the admin credentials are provided to the administrator (whether by visibly displaying the admin credentials (e.g., in an email or browser on a client device or on a display of a PAM system), copying the admin credentials into a copy buffer on a client device, etc.) and instances where a PAM system creates a remote session between the administrator's client device and the server without providing the admin credentials to the administrator. In other words, the moment when admin credentials are checked out can be the moment when the administrator, after requesting access to a server by specifying a reason code, is enabled to access the server.

A remote session should be construed as any connection between a server and a client device when a remote shell protocol is employed to establish the connection. Examples of suitable remote shell protocols include, for example, SSH, RDP, Telnet, FTP, ICA, VNC, X, etc.

In this specification, reference will be made to various amounts of time. The term "elapsed time" will refer to the amount of time that has elapsed since the administrator checked out the admin credentials, or, if the administrator has already checked the admin credentials back in, the total amount of time that the administrator had the admin credentials checked out. The term "normal amount of time" refers to an amount of time generated by a PAM system that defines how long it should take to perform a task associated with a particular reason code. As will be further described below, a normal amount for a particular reason code can be generated by a PAM system based on a number of elapsed times for that same reason code (e.g., by averaging the elapsed times).

Figure 1:
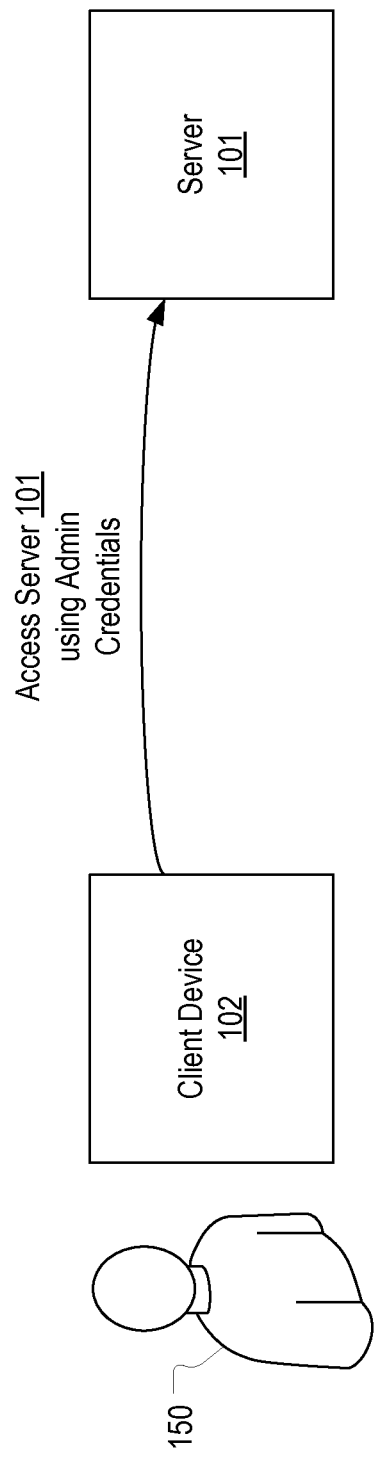
FIG. 1 illustrates a prior art example of how a client device can be used to remotely access a server using admin credentials without involvement of a PAM system.
Figure 2A:
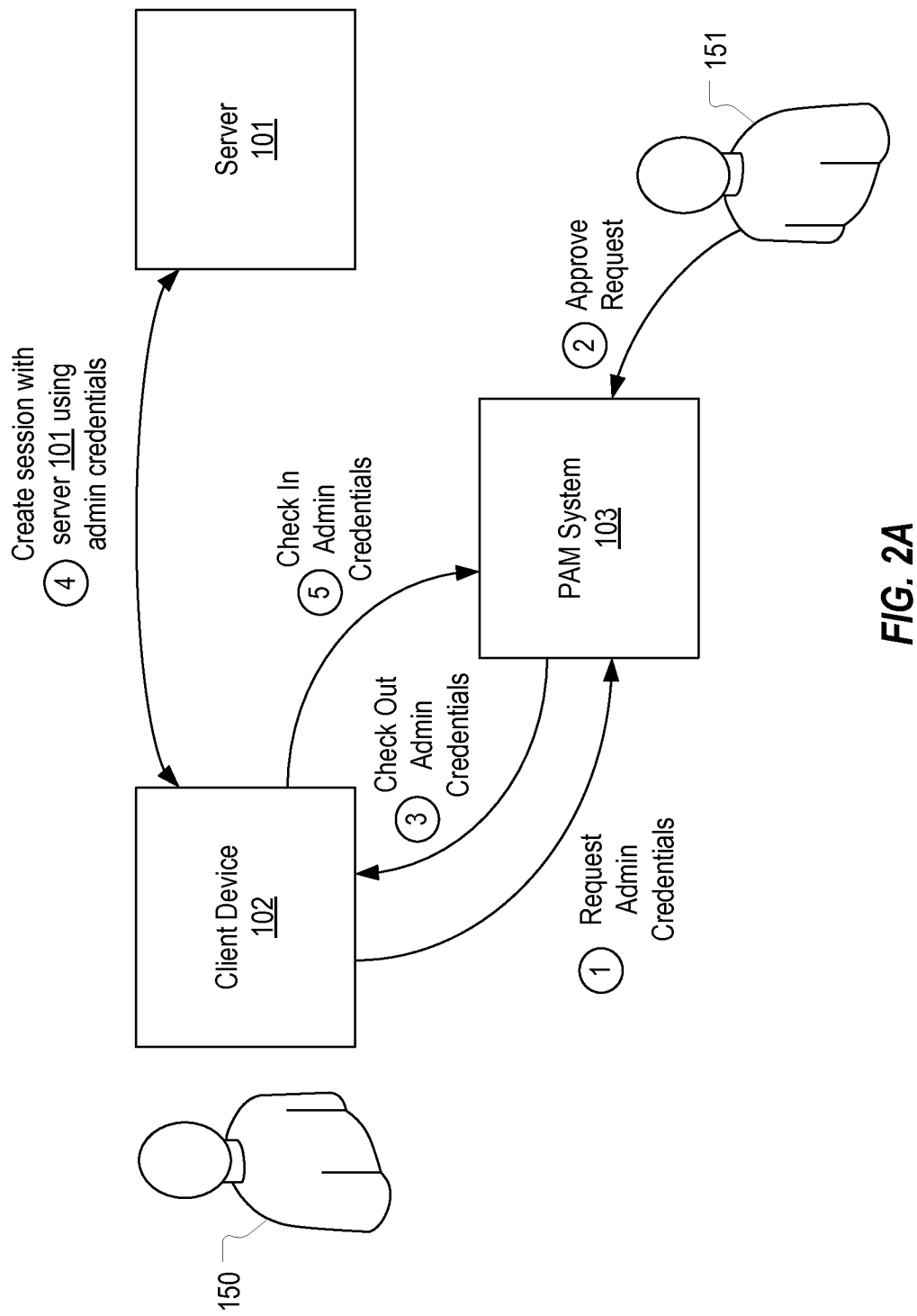
FIG. 2A illustrates a prior art example of how a PAM system can be used to control and monitor who obtains access to admin credentials used to access a server.
Figure 2B:
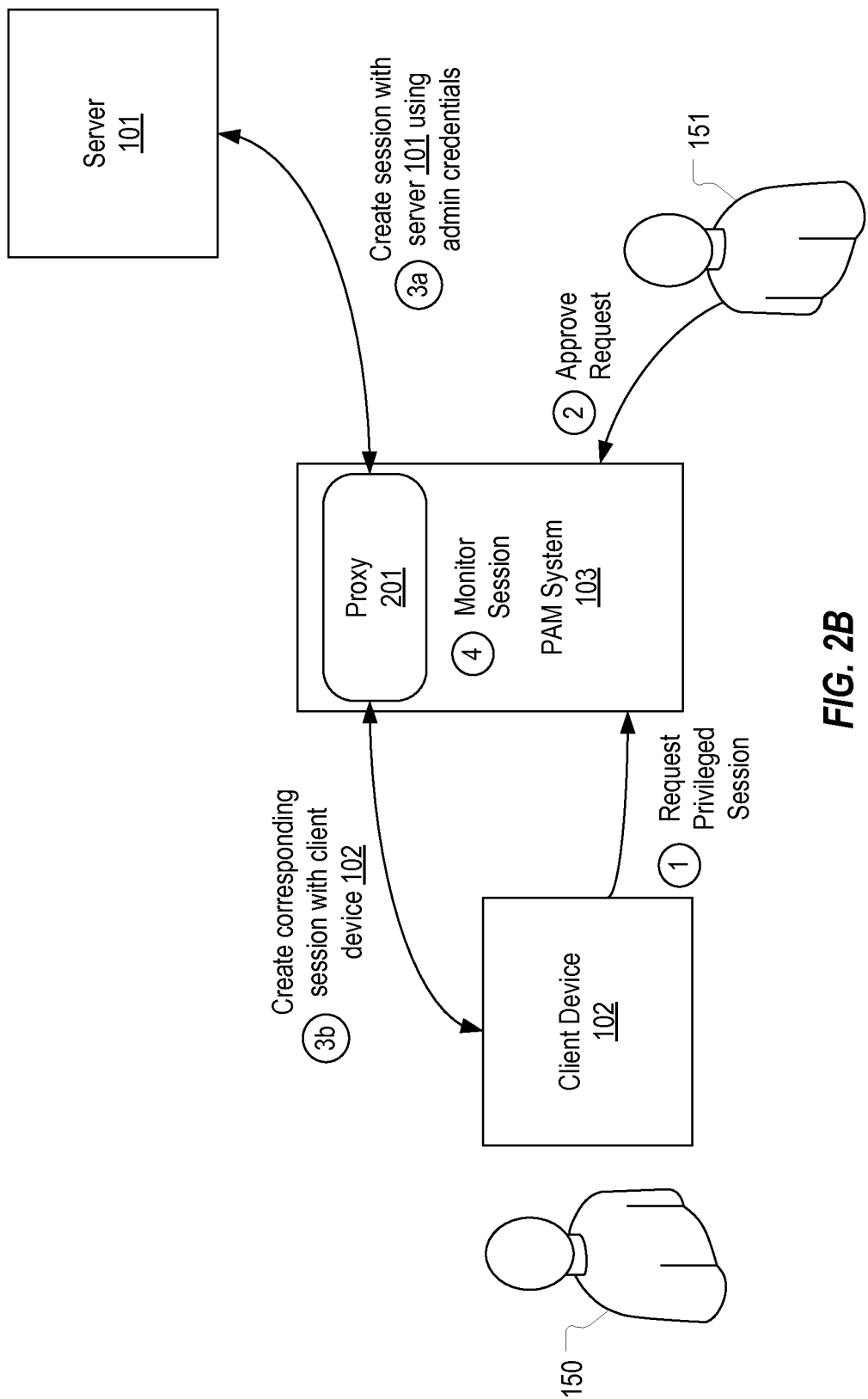
FIG. 2B illustrates a prior art example of how a PAM system can employ a proxy to control and monitor a client device's access to a server.
Figure 2C:
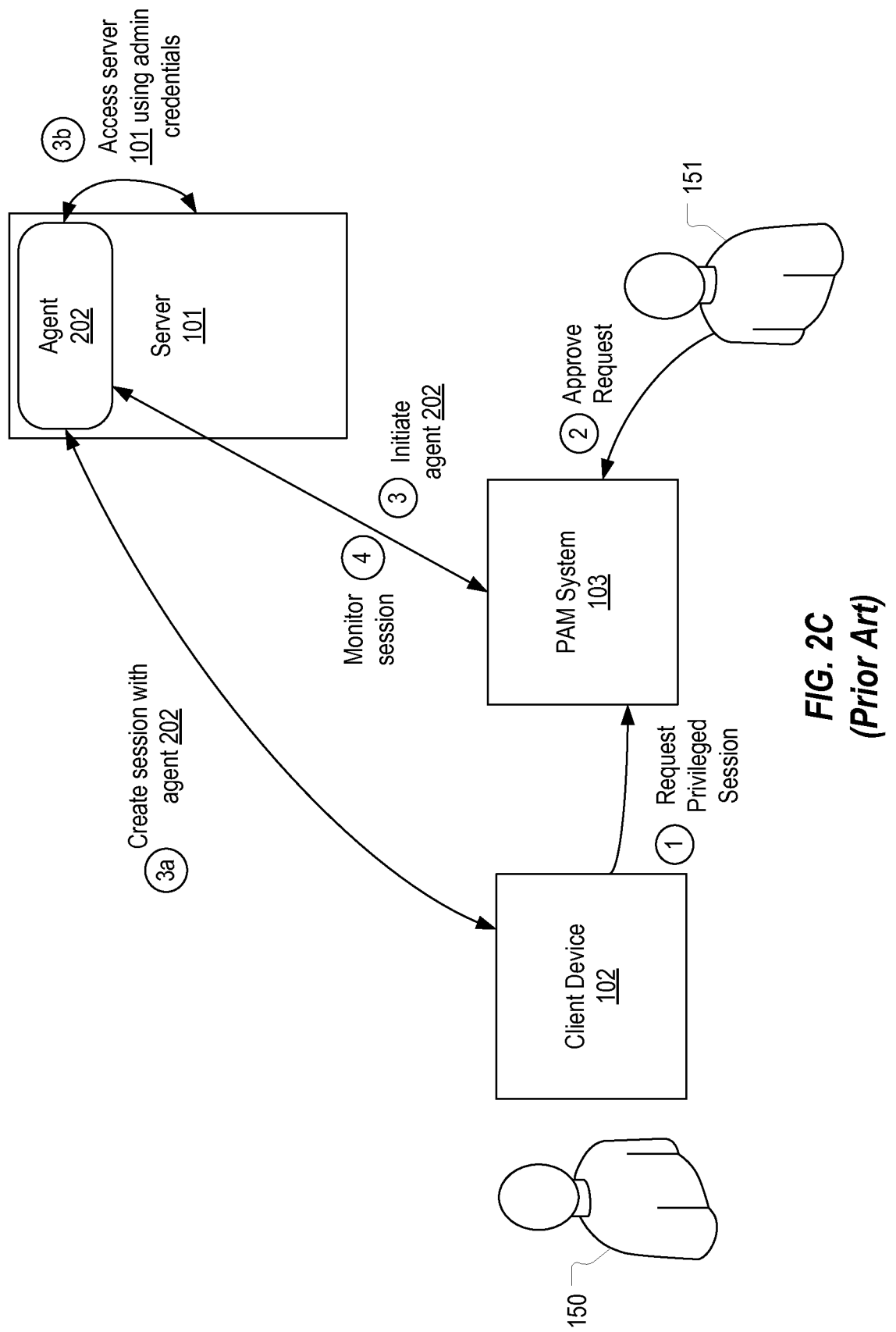
FIG. 2C illustrates a prior art example of how a PAM system can employ an agent hosted on a server to control and monitor a client device's access to the server.
Figure 3A:
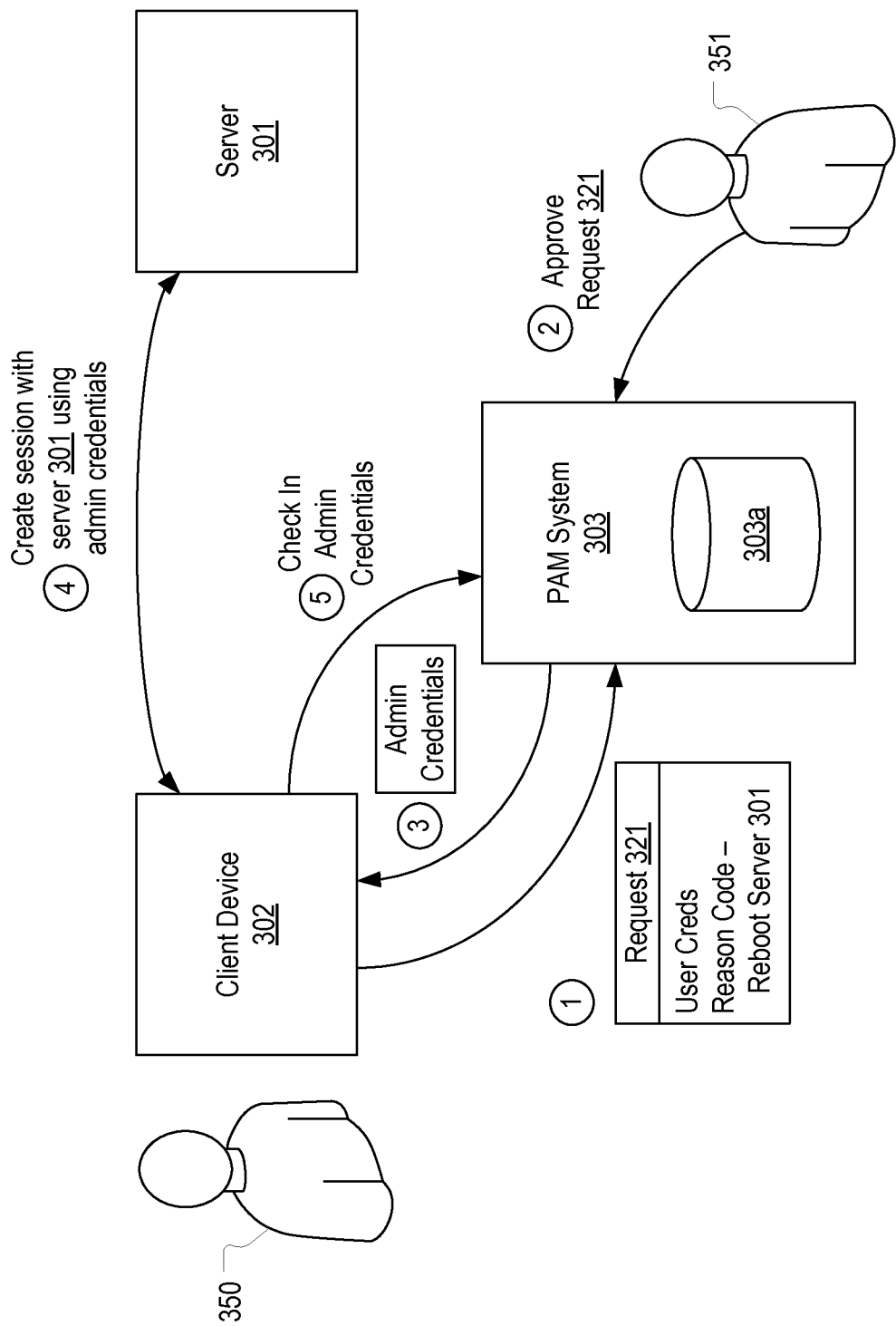
FIGS. 3A-3C each illustrate a different configuration of a PAM system when used to check out admin credentials to an administrator.

FIG. 3A, which is similar to FIG. 2A, provides an example where a PAM system 303 functions as a "vault" for admin credentials. Unlike FIG. 2A, however, PAM system 303 is configured to monitor an elapsed time over which an administrator 350 has checked out admin credentials and to compare this elapsed time to a normal amount of time for performing a task.

As described in the background, when administrator 350 desires access to server 301, administrator 350 can submit a request to PAM system 303. Accordingly, in FIG. 3A, a request 321 is shown as being sent by client device 302 to PAM system 303 at step 1. Request 321 includes user credentials for administrator 350 as well as a reason code of "Reboot Server 301." Upon receiving request 321, PAM system 303 can notify security officer 351 of the request thereby allowing security officer 351 to approve or deny the request. If security officer 351 approves request 321 (as shown in step 2), the admin credentials for accessing server 301 can be provided to administrator 350 in step 3.

Administrator 350 may then access server 301 using the received admin credentials in step 4. In this example, administrator 350 accesses server 301 by establishing a remote session directly with server 301. However, administrator 350 may also access server 301 directly by visiting the physical location of the server and logging in to the server. Finally, after accessing server 301 to reboot it (as specified by the reason code), administrator 350 can check in the admin credentials in step 5.

For purposes of the current discussion, it will be assumed that the elapsed time over which administrator 350 had checked out the admin credentials is the amount of time between steps 3 and 5. In other words, the elapsed time comprises the amount of time between the moment when the admin credentials were sent by PAM system 303 to client device 302 (or otherwise made accessible to administrator 350) and the moment when administrator 350 checked the admin credentials back in (i.e., the moment when administrator 350 indicated he was finished using the admin credentials).

The implementation of PAM system 303 as shown in FIG. 3A represents a use case where the present invention can be primarily beneficial. Because client device 302 establishes a remote session directly with server 301 without PAM system 303 acting as an intermediary, PAM system 303 has limited means for monitoring the remote session. By monitoring an elapsed time over which administrator 350 has checked out the admin credentials, PAM system 303 can provide some safeguards against improper usage of the admin credentials even though PAM system 303 may not be able to monitor the contents of communications sent over the remote session.

Figure 3B:
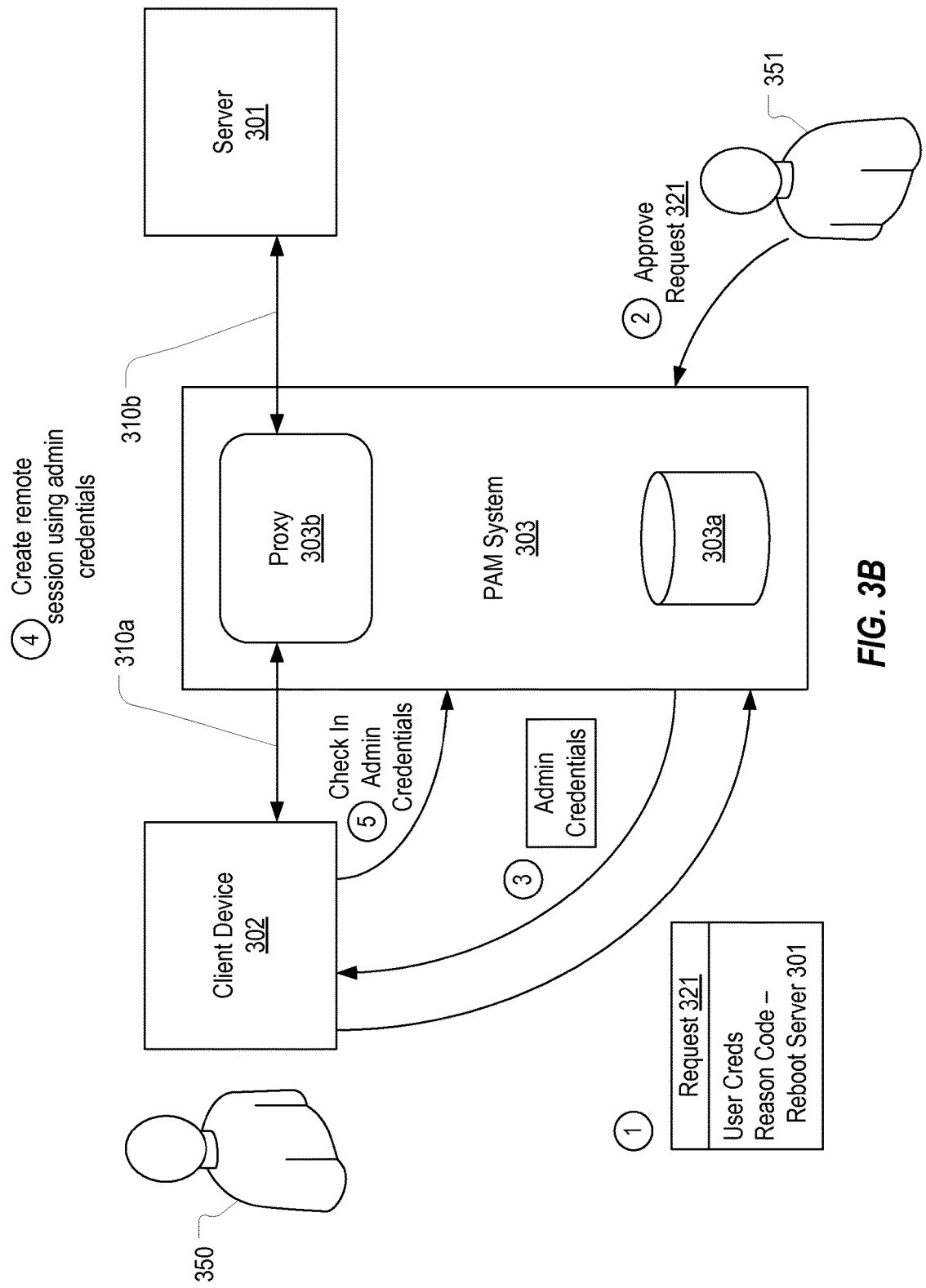

Although the implementation of PAM system 303 will primarily be used to describe the present invention, it is noted that the present invention can also be implemented when PAM system 303 functions as an intermediary between client device 302 and server 301. For example, FIG. 3B illustrates an implementation where PAM system 303 includes a proxy 303b through which client device 302 accesses server 301. In such cases, PAM system 303 can be configured to monitor an elapsed time over which client device 302 has checked out admin credentials.

In FIG. 3B, steps similar to those depicted in FIG. 3A are also shown. However, in step 4, client device 302 establishes a remote session 310a with proxy 303b using the admin credentials while proxy 303b establishes a corresponding remote session 310b with server 301 using the admin credentials. In such cases, the elapsed time over which the admin credentials are checked out to administrator 350 can comprise the difference between the moments when steps 3 and 5 occur as was the case with FIG. 3A. In contrast, in embodiments where PAM system 303 does not provide the admin credentials to administrator 350, but instead automatically creates remote sessions 310a, 310b, step 3 would constitute the creation of remote session 310a (i.e., providing administrator 350 with access to remote session 310a)

while step 5 would constitute the closing of remote session 310*a* (or otherwise the moment when administrator 350 can no longer access server 301 over remote session 310*a*). Accordingly, in such cases, the elapsed time over which the admin credentials are checked out to administrator 350 can comprise the difference between the moment when administrator 350 obtains access to server 301 via remote session 310*a* and the moment when administrator 350 no longer has access to server 301 via remote session 310*a* (e.g., the moment when administrator 350 closes remote session 310*a*).

Figure 3C:
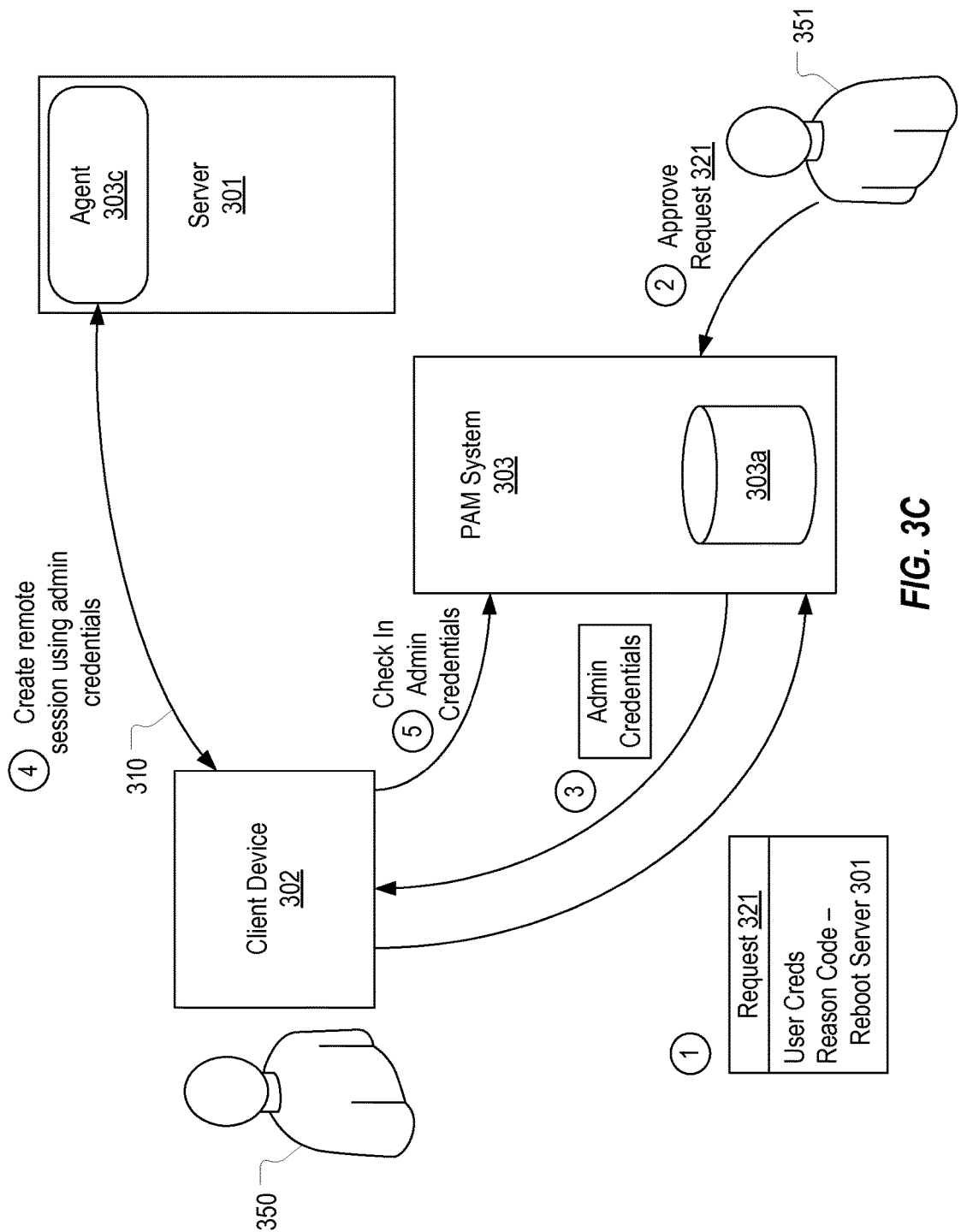

FIG. 3C illustrates an implementation of PAM system 303 that employs an agent 303*c*. In FIG. 3C, steps 1-5 are similar to those depicted in FIG. 3B except that a single remote session 310 is established between client device 302 and agent 303*c* in step 4. In this implementation, the elapsed time over which administrator 350 has checked out the admin credentials comprises the difference between the moments when steps 3 and 5 occur. As with FIG. 3B, if PAM system 303 is configured to automatically create remote session 310 without divulging the admin credentials to administrator 350, step 3 could comprise the moment when administrator 350 is given access to server 301 via remote session 310 while step 5 could comprise the moment when administrator 350 no longer has access to server 301 via remote session 310.

To summarize, regardless of the particular implementation of a PAM system, the elapsed time over which an administrator has checked out the admin credentials can comprise the difference between the moment when the administrator is enabled to access the server and the moment when the administrator surrenders such access. For security and accountability purposes, an entity usually implements a policy that requires an administrator to only use admin credentials to perform the task associated with the reason code specified by the administrator when requesting access to the admin credentials. In accordance with embodiments of the present invention, a PAM system can monitor the elapsed time over which an administrator has checked out the admin credentials to enforce such a policy.

In each of FIGS. 3A-3C, PAM system 303 includes a database 303*a*. In this specification, a database should be construed broadly to include any computing construct in which data and associations between such data can be stored and/or defined. PAM system 303 can use database 303*a* to store an association between a reason code and a normal amount of time required to perform the task associated with the reason code. In this way, PAM system 303 can compare an elapsed time over which an administrator has checked out admin credentials using a particular reason code to a normal amount of time associated with the particular reason code. If the elapsed time exceeds the corresponding normal amount, PAM system 303 can take an action to mitigate any potential harm to the server.

Figure 4A:
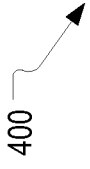

FIG. 4A illustrates an example data structure 400 that can be stored within database 303*a*. For ease of illustration, data structure 400 is shown as a table having a column 401 for reason codes and a column 402 for normal amounts of time. Column 401 includes four example reason codes: a reboot server reason code, a back up server reason code, an apply OS update A reason code, and a deploy application A reason code. As stated above, any type of reason code could be created and therefore the reason codes depicted in FIG. 4A should be considered as mere examples. Column 402 stores the normal amount of time that admin credentials are checked out when performing the task associated with the reason code. For example, these normal amounts of time can be two minutes and thirty seconds for rebooting a server, ten minutes for backing up a server, six minutes for applying OS update A, and seventeen minutes and thirty seconds for deploying application A. Accordingly, the normal amounts defined in data structure 400 can inform a PAM system of how long it should normally take to perform a task associated with a particular reason code.

As stated above, when an administrator desires to perform a task on a server that is protected by a PAM system, the PAM system typically requires that the administrator include a reason code in a request for access to the server. Accordingly, each time an administrator checks out admin credentials to access a server, the PAM system knows what task the administrator should be performing while the admin credentials are checked out. The PAM system can then compare the normal amount of time that is defined for the reason code to the elapsed time over which the administrator has checked out the admin credentials. If this elapsed time exceeds the normal amount, the PAM system can respond appropriately.

For example, with reference to FIGS. 3A and 4A, when administrator 350 requests access to server 301 and specifies a reason code of "Reboot Server 301," PAM system 303 can identify that the normal amount of time for rebooting a server is 2:30. Then, once PAM system 303 sends the admin credentials to client device 302, PAM system 303 can commence tracking the elapsed time over which administrator 350 has checked out the admin credentials. PAM system 303 can continue tracking this elapsed time until administrator 350 checks in the admin credentials. If during this tracking, PAM system 303 determines that the elapsed time exceeds the normal amount of 2:30, PAM system 303 can take appropriate action.

The above example represents a case where PAM system 303 maintains normal amounts of time that are not specific to any particular server or administrator. In other words, the normal amounts defined in data structure 400 can represent normal amounts for the reason code regardless of the server on which the task is performed and regardless of which administrator has checked out the admin credentials (i.e., which administrator is performing the task). However, in some embodiments, normal amounts for a reason code may be defined that are specific to a particular administrator or group of administrators, that are specific to a particular server, or that are specific to both an administrator and a server. For example, PAM system 303 may store a normal amount for the reboot server reason code that defines how long it should take administrator 350 to reboot server 301. Similarly, PAM system 303 may store a normal amount for the reboot server reason code that defines how long it should take administrator 350 to reboot a different server.

FIGS. 4B-4E each illustrate a different example of a data structure that can be used to store normal amounts that are specific to different criteria. In FIG. 4B, a data structure 410 is shown that defines a normal amount for various reason codes where each normal amount is specific to a particular server. As with data structure 400, data structure 410 includes a column 411 defining reason codes and a column 413 defining normal amounts. Data structure 410 also includes a column 412 that defines to which server the normal amount corresponds. As shown, a normal amount of 3:00 is defined for rebooting server A while a normal amount of 2:30 is defined for rebooting server B. Similarly, normal amounts of 11:00 and 9:30 are defined for backing up servers A and B respectively, normal amounts of 5:30 and 7:30 are defined for applying OS update A to servers A and B respectively, and normal amounts of 17:00 and 17:30 are defined for deploying application A on servers A and B respectively. Accordingly, the normal amounts defined in data structure 410 can inform a PAM system of how long it should typically take to perform a task associated with a particular reason code on a particular server.

In FIG. 4C, a data structure 420 is shown that defines a normal amount for various reason codes where each normal amount is specific to a particular administrator. Data structure 420 includes a column 421 defining reason codes and a column 423 defining normal amounts. Data structure 420 also includes a column 422 that defines to which administrator the normal amount corresponds. As shown, data structure 420 indicates that administrator A typically takes 3:30 to reboot a server, 12:00 to back up a server, 6:30 to apply OS update A to a server, and 19:00 to deploy application A to a server. Similarly, data structure 420 indicates that administrator B typically takes 3:00 to reboot a server, 14:30 to back up a server, 6:00 to apply OS update A to a server, and 16:00 to deploy application A to a server. Accordingly, the normal amounts defined in data structure 420 can inform a PAM system of how long it should typically take a particular administrator to perform a task associated with a particular reason code.

FIG. 4D illustrates a data structure 430 that is similar to data structure 420 except that the normal amounts defined in data structure 430 are specific to a group of administrators rather than to a particular administrator. Accordingly, the normal amounts defined in data structure 430 can inform a PAM system of how long it should typically take an administrator that belongs to a particular group to perform a task associated with a particular reason code.

Although the present invention can be implemented when employing normal amounts that are generic to a reason code (FIG. 4A) or that are specific to a server (FIG. 4B), an administrator (FIG. 4C), or a group of administrators (FIG. 4D), a more granular level of monitoring can be performed when a normal amount specific to both an administrator (or group) and a server is employed. In other words, by identifying a normal amount of time that it typically takes for a particular administrator to perform a particular task on a particular server, highly granular monitoring can be performed.

FIG. 4E illustrates a data structure 440 that defines a normal amount for various reason codes where each normal amount is specific to a particular administrator and a particular server. As with the previously described data structures, data structure 440 includes a column 431 defining reason codes and a column 434 defining normal amounts. Data structure 440 also includes a column 432 that defines to which server the normal amount corresponds and a column 433 that defines to which administrator the normal amount corresponds. For example, data structure 440 defines that it typically takes administrator A 2:30 to reboot server A and 3:30 to reboot server B and that it typically takes administrator B 2:00 to reboot server A and 2:30 to reboot server B. Similarly, data structure 440 defines that it typically takes administrator A 13:00 to back up server A and 23:00 to back up server B and that it typically takes administrator B 11:00 to back up server A and 20:00 to back up server B.

Figure 5:
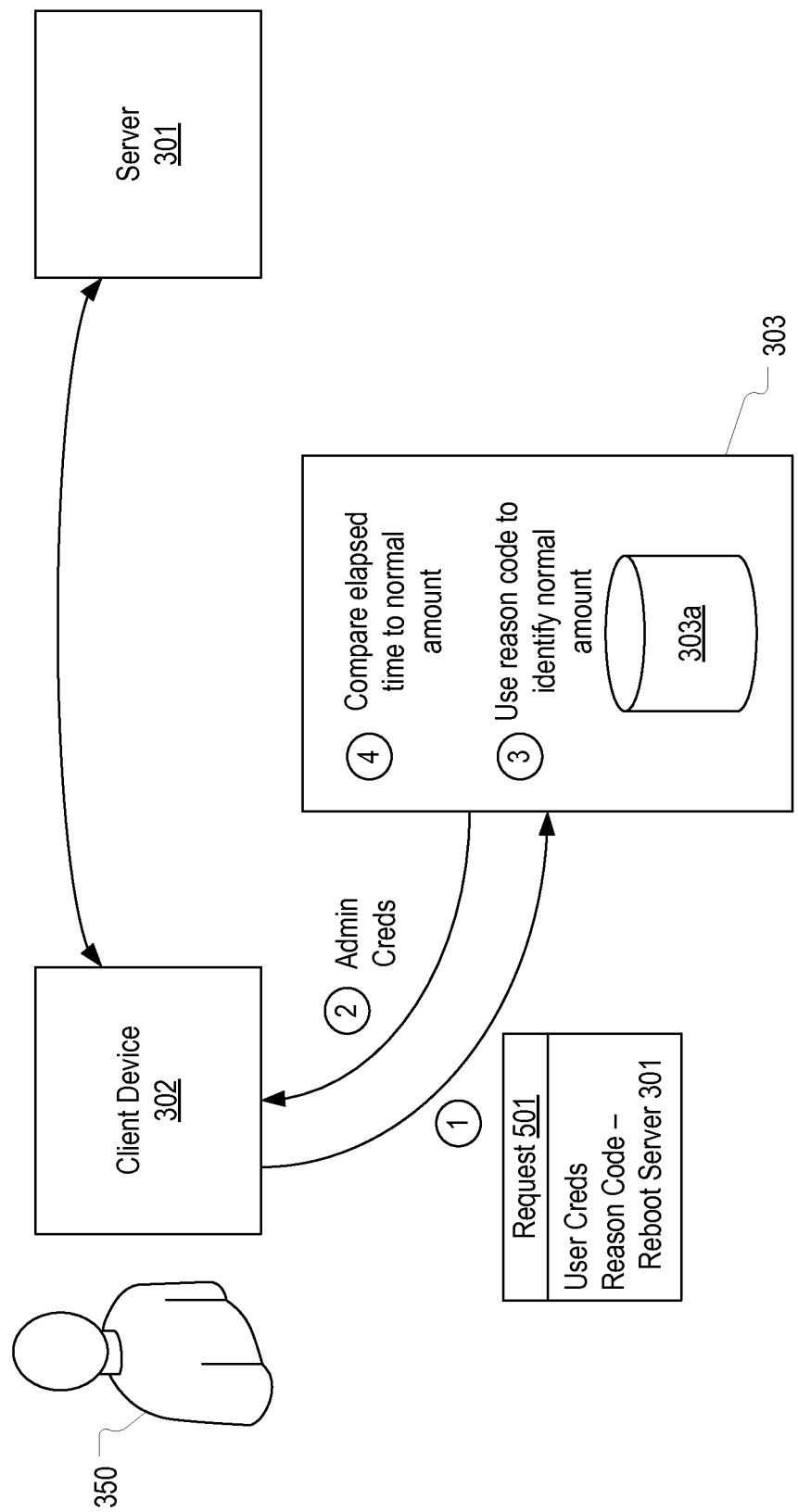
FIG. 5 illustrates an example flow diagram identifying how a PAM system can monitor an elapsed time over which admin credentials are checked out and compare the elapsed time to a corresponding normal amount.

FIG. 5 illustrates an example of how PAM system 303 can monitor an elapsed time over which an administrator has checked out admin credentials when PAM system 303 functions as a vault for admin credentials. It is noted that the steps depicted in FIG. 5 can equally represent the process of monitoring an elapsed time when PAM system 303 functions as an intermediary as shown in FIGS. 3B and 3C.

In step 1, administrator 350 employs client device 302 to submit request 501 to PAM system 303. Request 501 includes administrator 350's user credentials and specifies a reason code of "Reboot server 301." In step 2, it is assumed that request 501 has been approved and therefore the admin credentials are sent to client device 302 such that administrator 350 has checked out the admin credentials. In step 3, which is not required to be performed after step 2, PAM system 303 accesses database 303a using the reason code "reboot server" as specified in request 501 to identify a normal amount for the reboot server reason code.

As described above, the normal amount obtained by PAM system 303 in this step could be a normal amount that is generic to the reason code "reboot server," a normal amount that is specific to server 301, a normal amount that is specific to administrator 350 (or a group to which administrator 350 belongs), or a normal amount that is specific to both administrator 350 (or a group to which administrator 350 belongs) and server 301.

Regardless of which type of normal amount PAM system 303 employs, in step 4, PAM system 303 monitors the elapsed time over which administrator has checked out the admin credentials and compares this elapsed time to the corresponding normal amount. For example, assuming database 303a stores data structure 440 and that administrator 350 is administrator A and server 301 is server A, PAM system 303 can obtain a normal amount of 2:30 which defines that administrator 350 normal takes two minutes and thirty seconds to reboot server 301. In such a case, PAM system 303 can track the elapsed time (i.e., how long administrator 350 has had the admin credentials) and compare the elapsed time to the 2:30 normal amount. If the elapsed time exceeds the 2:30 normal amount by some threshold, PAM system 303 can take an appropriate action.

The type of action taken by PAM system 303 may vary based on the amount by which the elapsed time exceeds the normal amount and/or the configuration of PAM system 303. For example, after the elapsed time exceeds the normal amount by a first threshold, PAM system 303 may notify a security officer or otherwise create a notice that identifies that the elapsed time exceeded the normal amount thereby allowing the security officer to investigate the occurrence. In such cases, any notification or notice may indicate the amount by which the elapsed time exceeded the normal amount to provide context to the violation. In some embodiments, such notifications and/or notices could be generated while the admin credentials remain checked out (e.g., as soon as the elapsed time exceeds the normal amount by a specified threshold, a notification and/or notice could be generated).

In embodiments where PAM system 303 acts as an intermediary or otherwise has the ability to control/monitor a remote session between client device 302 and server 301 in some manner, after the elapsed time exceeds the normal amount by a second threshold, PAM system 303 could flag, kill, record, or otherwise monitor the remote session.

When the elapsed time exceeds the normal amount, there may be many different reasons for the occurrence. The present invention can allow a security officer to be notified of such occurrences so that the security officer can identify the particular reason. For example, the elapsed time may exceed the normal amount when the administrator does not know how to perform the task in the proper manner. In such cases, the security officer can identify that the administrator needs training. In some cases, the elapsed time may exceed the normal amount because the administrator used the wrong reason code either because an appropriate reason code did not exist for the task or because the administrator simply did not select the proper reason code. In such cases, the security officer could identify that a new reason code should be created or provide training to the administrator.

On the other hand, the elapsed time may exceed the normal amount for malicious reasons. For example, a hacker may obtain access to administrator 350's user credentials and thereby submit a request for admin credentials. In such a case, the hacker is unlikely to have the admin credentials checked out for an elapsed time that conforms to the normal amount for whatever reason code was specified in the request. Therefore, in such cases, a security officer would likely be promptly notified of the hacker's actions. Similarly, if an administrator, while accessing a server for a legitimate task, decided to also perform an improper action, the added time required to perform this improper action could likely cause the elapsed time to exceed the normal amount. In such a case, the security officer would likely be able to identify the administrator's improper action.

Normal amounts may be generated in various ways. In some embodiments, a normal amount may simply be specified by a security officer (e.g., based on knowledge of how long it should take to perform a task or based on industry averages). In other embodiments, however, a PAM system may be configured to implement a learning mode by which normal amounts are generated. While in this learning mode, the PAM system can monitor elapsed times as described above (e.g., by identifying the amount of time between the moment when the administrator checked out admin credentials and the moment when the administrator checked in the admin credentials). The PAM system can then employ an algorithm to generate a normal amount for a particular reason code based on identified elapsed times associated with that reason code. For example, after identifying an elapsed time for five separate requests for admin credentials that were each associated with a reboot server reason code, a PAM system could employ an algorithm to generate a normal amount for the reboot server reason code from the five identified elapsed times. In this way, a PAM system can learn over time how long it should normally take to perform a particular task.

In some embodiments, the algorithm could be a simple averaging algorithm, while in other embodiments, a more complex algorithm could be employed. For example, while in the learning mode, a PAM system may first determine whether an elapsed time lies within an acceptable range (e.g., by determining whether the elapsed time exceeds the corresponding normal amount by some threshold), and if so, use the elapsed time to create or update an normal amount. Otherwise, if an elapsed time lies outside an acceptable range, the elapsed time could be discarded and not used to update the corresponding normal amount.

This learning mode can be employed initially until a sufficient number of elapsed times have been identified to generate a reasonable normal amount for a particular combination of criteria. After a normal amount has been established, the learning mode can still be employed to update the normal amount using elapsed times that were not determined to exceed the normal amount by a specified threshold. Accordingly, the PAM system can increase the accuracy of its normal amounts over time as additional requests for admin credentials are processed.

Figure 6:
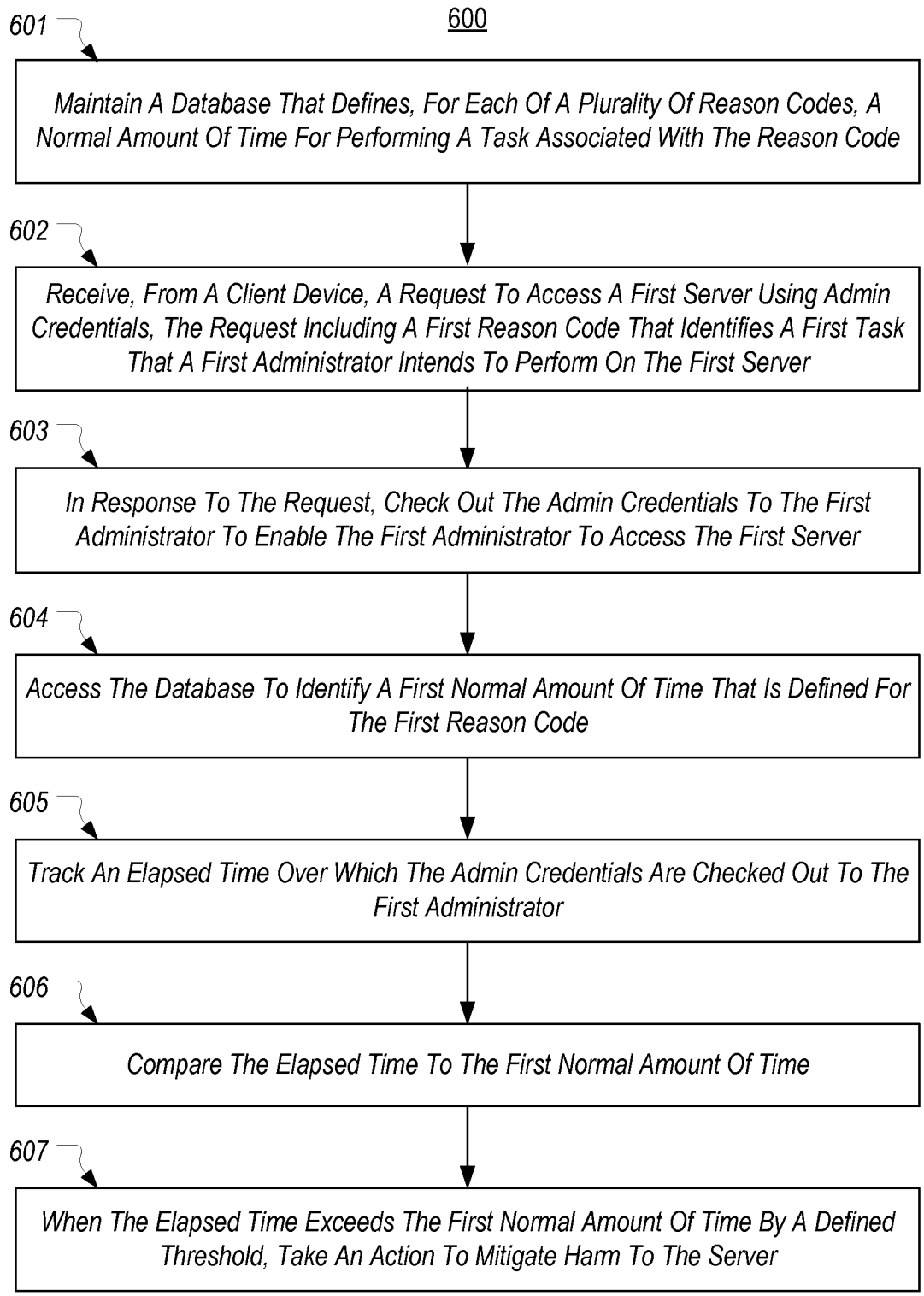
FIG. 6 illustrates a flowchart of an example method for detecting unauthorized, risky, or inefficient usage of admin credentials.

FIG. 6 illustrates a flowchart of an example method 600 for detecting unauthorized, risky, or inefficient usage of admin credentials. Although method 600 will be described primarily with reference to FIG. 5, it is to be understood that method 600 can be implemented by any PAM system. Also, although method 600 will be described as employing data structure 400, method 600 should be construed as being capable of employing any suitable data structure that defines normal amounts of time for reason codes including, but not limited to, any of data structures 410-440.

Method 600 includes an act 601 of maintaining a database that defines, for each of a plurality of reason codes, a normal amount of time for performing a task associated with the reason code. For example, PAM system 303 can maintain a database 303*a* that includes data structure 400.

Method 600 includes an act 602 of receiving, from a client device, a request to access a first server using admin credentials, the request including a first reason code that identifies a first task that a first administrator intends to perform on the first server. For example, PAM system 303 can receive request 501 that provides a reboot server reason code.

Method 600 includes an act 603 of, in response to the request, checking out the admin credentials to the first administrator to enable the first administrator to access the first server. For example, PAM system 303 can send admin credentials to client device 302 to allow the client device to access server 301.

Method 600 includes an act 604 of accessing the database to identify a first normal amount of time that is defined for the first reason code. For example, PAM system 303 can access data structure 400 to identify a normal amount of 2:30 for the reboot server reason code.

Method 600 includes an act 605 of tracking an elapsed time over which the admin credentials are checked out to the first administrator. For example, PAM system 303 can identify the elapsed time since the admin credentials were sent to client device 302.

Method 600 includes an act 606 of comparing the elapsed time to the first normal amount of time. For example, PAM system 303 can compare the elapsed time to the normal amount of 2:30.

Method 600 includes an act 607 of taking an action to mitigate harm to the server when the elapsed time exceeds the first normal amount of time by a defined threshold. For example, PAM system 303 can generate a notification or notice or can flag, monitor, record, or kill a remote session established between client device 302 and server 301.

FIG. 7 illustrates a flowchart of an example method 700 for creating a database that defines, for each of a plurality of reason codes, a normal amount of time for performing a task associated with a reason code. Any PAM system, including those described above, can be configured to implement method 700. Although method 700 will be described with reference to data structure 400, it is to be understood that method 700 can be used to create/maintain associations between reason codes and normal amounts of time using any suitable data structure.

Method 700 includes an act 701 of identifying, for each of the plurality of reason codes, a plurality of requests for admin credentials that specify the reason code. For example, PAM system 303 can identify a number of requests that specify a reboot server reason code or a back up server reason code.

Method 700 includes an act 702 of identifying, for each of the plurality of requests, an elapsed time over which the admin credentials were checked out while a task associated with the reason code was performed. For example, PAM system 303 can identify, for each request that specifies a reboot server reason code or a back up server reason code, how long the admin credentials were checked out while rebooting a server or backing up a server.

Method 700 includes an act 703 of generating a normal amount for the reason code based on the plurality of identified elapsed times such that the normal amount defines an amount of time that is normally required to perform the task associated with the reason code. For example, PAM system 303 can generate normal amount of 2:30 that defines that admin credentials are normally checked out for two and a half minutes when rebooting a server and a normal amount of 10:00 that defines that admin credentials are normally checked out for ten minutes when backing up a server.

In summary, the present invention provides a way to determine whether an administrator is taking too long to complete a specified task. By determining when an administrator is taking too long, a PAM system can take appropriate actions to mitigate any potential harm that may be caused to a server or to assist in the identification of areas in which an entity may improve its efforts to comply with a policy. The present invention can be particularly beneficial in PAM systems that function only as vaults for admin credentials since such systems typically have few if any options for actively monitoring remote sessions with servers.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a privileged account management system that comprises at least one processor and memory, for detecting unauthorized, risky, or inefficient usage of admin credentials, the method comprising:
   maintaining, by the privileged account management system, a database that defines, for each of a plurality of reason codes, a normal amount of time for performing a task associated with the reason code;
   receiving, from a first administrator using a client device, a request for admin credentials to be used to access a first server, the request including a first reason code that identifies a first task that the first administrator intends to perform on the first server;
   in response to the request, checking out the admin credentials to the first administrator to enable the first administrator to access the first server;
   accessing the database to identify a first normal amount of time that is defined for the first reason code;
   tracking an elapsed time over which the admin credentials are checked out to the first administrator;
   comparing the elapsed time to the first normal amount of time; and
   when the elapsed time exceeds the first normal amount of time by a defined threshold, taking an action to mitigate harm to the server.

2. The method of claim 1, wherein the database stores a plurality of normal amounts of time for the first reason code, and wherein the first normal amount of time defines an amount of time that the first administrator normally takes to perform the first task.

3. The method of claim 1, wherein the database stores a plurality of normal amounts of time for the first reason code, and wherein the first normal amount of time defines an amount of time that is normally required to perform the first task on the first server.

4. The method of claim 1, wherein the database stores a plurality of normal amounts of time for the first reason code, and wherein the first normal amount of time defines an amount of time that the first administrator normally takes to perform the first task on the first server.

5. The method of claim 4, wherein the plurality of normal amounts of time for the first reason code includes a second normal amount of time that defines an amount of time that the first administrator normally takes to perform the first task on a second server.

6. The method of claim 4, wherein the plurality of normal amounts of time for the first reason code includes a second normal amount of time that defines an amount of time that a second administrator normally takes to perform the first task on the first server.

7. The method of claim 1, wherein the action comprises notifying a security officer that the elapsed time has exceeded the first normal amount of time.

8. The method of claim 1, wherein the action comprises flagging, monitoring, recording, or killing a remote session between the client device and the first server.

9. The method of claim 1, wherein the action comprises storing a notice in association with the request, the notice identifying that the elapsed time exceeded the first normal amount of time.

10. The method of claim 1, wherein the first normal amount is generated based on a plurality of previously monitored elapsed times that were associated with the first reason code.

11. The method of claim 1, wherein checking out the admin credentials comprises one of:
sending the admin credentials to the client device; or
creating a remote session with the client device to allow the client device to access the first server.

12. The method of claim 1, wherein the action is taken while the admin credentials remain checked out to the first administrator.

13. A method, implemented by a privileged account management system that comprises at least one processor and memory, for creating a database that defines, for each of a plurality of reason codes, a normal amount of time for performing a task associated with a reason code, the method comprising:
for each of the plurality of reason codes:
receiving, at the privileged account management system, a plurality of requests, from one or more administrators using one or more client devices, for admin credentials that specify the reason code;
for each of the plurality of requests, identifying an elapsed time over which the admin credentials were checked out while a task associated with the reason code was performed; and
generating a normal amount for the reason code based on the plurality of identified elapsed times such that the normal amount defines an amount of time that is normally required to perform the task associated with the reason code.

14. The method of claim 13, further comprising:
for at least one of the plurality of reason codes:
for each of the plurality of requests, identifying criteria of the request, the criteria comprising one or both of an administrator that made the request and a server specified in the request; and
generating a plurality of normal amounts for the reason code, each normal amount being specific to a different combination of the identified criteria.

15. The method of claim 14, wherein for the at least one of the plurality of reason codes, the plurality of normal amounts comprise a first normal amount that defines an amount of time that a first administrator normally takes to perform the associated task on a first server and a second normal amount that defines an amount of time that that first administrator normally takes to perform the associated task on a second server.

16. The method of claim 14, wherein for the at least one of the plurality of reason codes, the plurality of normal amounts comprise a first normal amount that defines an amount of time that a first administrator normally takes to perform the associated task on a first server and a second normal amount that defines an amount of time that a second administrator normally takes to perform the associated task on the first server.

17. The method of claim 13, wherein generating a normal amount comprises updating a previously generated normal amount.

18. A privileged account management system comprising:
one or more processors; and
one or more non-transitory computer storage media storing computer executable instructions which when executed by the one or more processors implement a method for detecting unauthorized, risky, or inefficient usage of admin credentials, the method comprising:
maintaining a database that defines, for each of a plurality of reason codes, a plurality of normal amounts of time for performing a task associated with the reason code, each of the plurality of normal amounts of time being associated with a different combination of criteria, each combination of criteria comprising one or more of an administrator that performs the task and a server on which the task is performed;
receiving, from a first administrator using a client device, a request for admin credentials to be used to access a first server, the request including a first reason code that identifies a first task that the first administrator intends to perform on the first server;
in response to the request, checking out the admin credentials to the first administrator to enable the first administrator to access the first server;
accessing the database to identify a first normal amount of time that is defined for the first reason code, the first normal amount also being associated with a combination of criteria including one or both of the first administrator and the first server;
tracking an elapsed time over which the admin credentials are checked out to the first administrator;
comparing the elapsed time to the first normal amount of time; and
when the elapsed time exceeds the first normal amount of time by a defined threshold, taking an action to mitigate harm to the server.

19. The privileged account management system of claim 18, wherein the first normal amount is associated with the first administrator and the first server.

20. The privileged account management system of claim 18, further comprising:
receiving a second request that includes the first reason code; and
accessing the database to identify a second normal amount of time that is defined for the first reason code, the second normal amount being associated with a different combination of criteria than the combination of criteria associated with the first normal amount.

* * * * *